(No Model.)
F. A. BUNNELL.
APPARATUS FOR PURIFYING WATER.
No. 469,770. Patented Mar. 1, 1892.
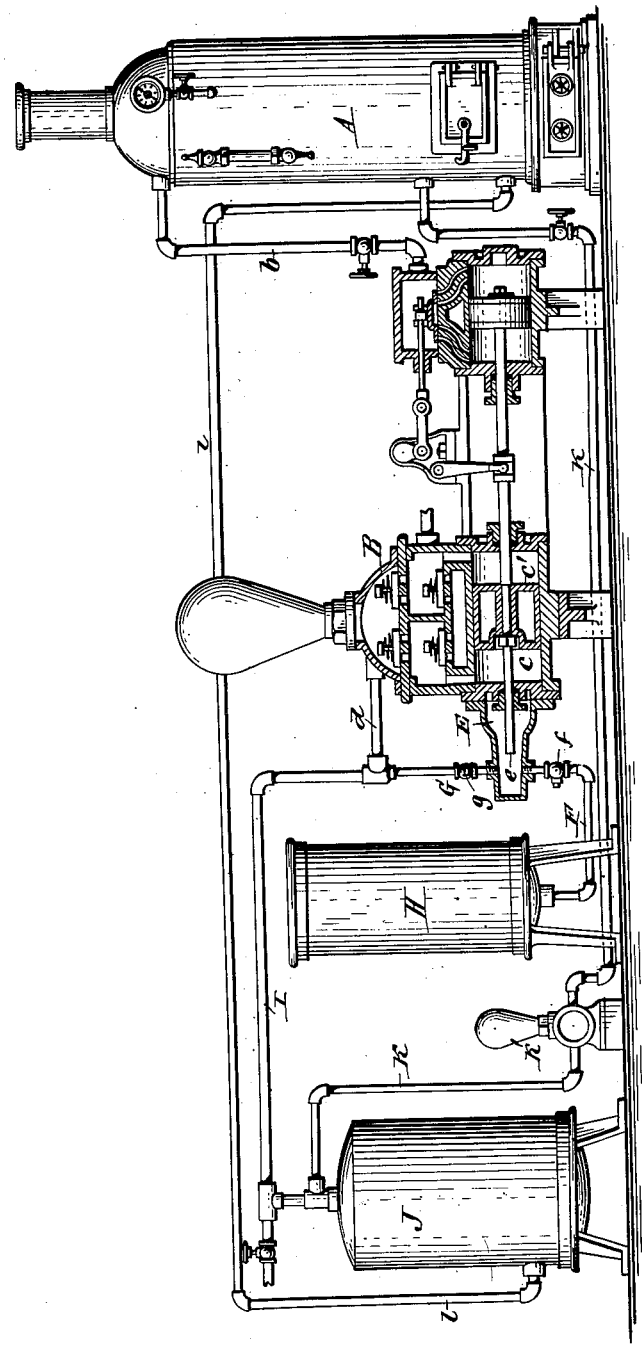

UNITED STATES PATENT OFFICE.

FRANCIS A. BUNNELL, OF SYRACUSE, NEW YORK, ASSIGNOR TO CHRISTOPHER C. BRADLEY AND MARY E. BUNNELL, OF SAME PLACE.

APPARATUS FOR PURIFYING WATER.

SPECIFICATION forming part of Letters Patent No. 469,770, dated March 1, 1892.

Application filed July 13, 1891. Serial No. 399,269. (No model.)

*To all whom it may concern:*

Be it known that I, FRANCIS A. BUNNELL, a citizen of the United States, residing at Syracuse, in the county of Onondaga and State of New York, have invented a new and useful Improvement in Apparatus for Purifying Water, of which the following is a specification.

This invention relates to the removal of scale-forming impurities from feed-water in a simple and expeditious manner.

The scale-forming impurities contained in the feed-water for steam-boilers consist in many localities principally of bicarbonate of lime and sulphate of lime, both of which substances are held in solution. By heating the feed-water to a suitable temperature the bicarbonate of lime is decomposed into carbonate of lime, which is insoluble, and into carbon dioxide. The sulphate of lime can be decomposed by adding a precipitant—such as carbonate of soda—whereby carbonate of lime and sulphate of soda are formed, the former being insoluble, while the latter remains in solution in the boiler and does not form scale.

In the method of purifying water described in Letters Patent No. 445,537, granted to me February 3, 1891, and in other methods for the same purpose the water is heated by means of a surface-heater, which is supplied with exhaust-steam. This heater is expensive and its operation is not entirely satisfactory, because in some localities scale is deposited in the heater in spite of all precautions to the contrary. The object of my present invention is to dispense with this heater and to heat the feed-water in a simple and more direct manner.

The accompanying drawing represents a sectional elevation of my improved apparatus for purifying the water.

A represents a steam-boiler of any ordinary or suitable construction.

B represents a feed-pump, *b* the steam-pipe leading from the boiler to the steam-chest of the pump, and *c* the main pumping-cylinder, which receives the feed-water from any available source and delivers it through the pipe *d*.

E is the cylinder of the precipitant-pump, which is secured to the rear end of the main pumping-cylinder *c*, and *e* the piston of the precipitant-pump, secured to the piston *c'* of the main pumping-cylinder.

F is the suction-pipe of the precipitant-pump, provided with a check-valve *f*, and G its delivery-pipe provided with a check-valve *g*.

H represents a tank containing a solution of carbonate of soda or of some other precipitant prepared with reference to the particular kind and quality of impurities contained in the feed-water. The suction-pipe of the precipitant-pump connects with this tank, so as to take its supply therefrom. The solution of the precipitant is so prepared that it will render insoluble all the sulphate of lime or other similar impurity which may be contained in the feed-water and which would not be rendered insoluble by simply heating the water. In some localities the feed-water contains substances which act as precipitants for the sulphate of lime under the application of heat, and when this is the case only so much of the precipitant is required to be injected into the feed-water as is necessary to decompose so much of the sulphate of lime as will not be decomposed by the precipitant already contained in the water. The precipitant-pump is so proportioned or regulated as to inject proper quantities of the precipitant into the feed-water at suitable intervals. In the construction represented in the drawing the main pump is double acting and the precipitant-pump is single acting, so that there is one injection of the precipitant for each double stroke of the main piston.

The delivery-pipes G and *d* of the precipitant-pump and main pump connect with the same discharge or inlet pipe I, which leads to the top of a filter J of any suitable or well-known construction.

*k* represents a pipe connecting the lower portion of the steam-boiler with the disel arge-pipe I, whereby hot water is delivered into the feed-water before it enters the filter for the purpose of heating the feed-water.

*k'* represents an auxiliary pump connected with the hot-water pipe *k*, whereby the hot water is forced into the feed-water-discharge pipe I. The hot water from the boiler in mingling with the feed-water charged with the precipitant raises the temperature of the latter sufficiently to convert the bicarbonate of lime into carbonate of lime and carbon dioxide, while the sulphate of lime is decomposed by the action of the carbonate of soda forming carbonate of lime and sulphate of soda. The heated feed-water passes downwardly through the filter and the latter separates the carbonate of lime and other insoluble impurities from the feed-water. The impurities collect in the filter and are removed therefrom by washing the latter from time to time. The purified water escapes from the bottom of the filter through an outlet-pipe $l$ and passes to the water-space of the steam-boiler.

By drawing hot water from the boiler for the purpose of heating the feed-water this hot water is again filtered with the new feed-water in passing through the filter and still further deprived of any impurities which it may contain and which may have become insoluble after having entered the boiler, thereby effecting a more thorough separation of the impurities in the feed-water and reducing incrustation in the boiler to a minimum. Furthermore, the expensive heater is dispensed with and the feed-water is heated in a more direct, uniform, and satisfactory manner.

I claim as my invention—

1. The herein-described method of purifying feed-water, which consists in injecting a precipitant into the feed-water, then heating the feed-water containing the precipitant by injecting hot water into the feed-water, and then passing the heated feed-water through a filter, in which the insoluble matter is intercepted, substantially as set forth.

2. The herein-described method of purifying feed-water for steam-boilers, which consists in heating the feed-water by injecting hot water from the boiler into the feed-water, then passing the heated feed-water through a filter, in which the insoluble matter is intercepted, and then feeding the heated and filtered water to the boiler, whereby the boiler-water is repeatedly filtered and at the same time utilized for heating the feed-water, substantially as set forth.

3. The herein-described method of purifying feed-water for steam-boilers, which consists in injecting a precipitant into the feed-water, then heating the feed-water containing the precipitant by injecting hot water from the boiler into the feed-water, and then passing the heated water through a filter, in which the insoluble matter is intercepted, substantially as set forth.

4. The combination, with the steam-boiler and the filter having its outlet connected with said boiler, of a feed-pump and a precipitant-pump, both discharging into the inlet of the filter, and a hot-water-supply pipe connecting the water-space of the boiler with the inlet of the filter, substantially as set forth.

5. The combination, with the steam-boiler provided with a feed-water pipe and a filter provided with an inlet-pipe and connected at its outlet with the boiler feed-pipe, of a feed-water pump and a precipitant-pump working in unison with the feed-water pump, both pumps discharging into the inlet-pipe of the filter, a hot-water pipe connecting the water-space of the boiler with the inlet-pipe of the filter, and a pump arranged in said hot-water pipe and supplying hot water to the inlet of the filter, substantially as set forth.

Witness my hand this 3d day of July, 1891.

FRANCIS A. BUNNELL.

Witnesses:
 THEO. L. POPP,
 DANIEL F. SALMON.